Patented Mar. 10, 1942

2,275,856

UNITED STATES PATENT OFFICE 2,275,856

WHITE PIGMENT AND THE PROCESS OF PREPARING THE SAME

Ekbert Lederle, Ludwigshafen, and Rudolf Brill, Heidelberg, Germany

No Drawing. Application April 17, 1937, Serial No. 137,494. In Germany April 17, 1936

5 Claims. (Cl. 106—300)

This invention relates to white pigments and to their method of preparation. It has particular reference to white pigments comprising zinc titanates and titanium dioxide. More especially it relates to white pigments comprising zinc titanates and titanium dioxide in which a substantial amount of the titanium dioxide possesses the crystalline structure of rutile.

An object of this invention is a method for preparing white pigments characterized as being highly resistant to chalking and comprising zinc titanates and titanium dioxide. Another object of the invention is a method for the preparation of white pigments comprising zinc titanates and titanium dioxide in which a substantial amount of the titanium dioxide possesses the crystalline structure of rutile. Other objects of this invention are represented by the novel white pigments obtained from the methods of the present invention.

In accordance with the present invention white pigments which are resistant to chalking are obtained by calcining white pigments, containing a zinc titanate or a zinc magnesium-titanate, or mixtures of starting materials forming such white pigments, for some time, for instance about 5 to about 12 hours at temperatures above 840°, preferably at about 1100°. When using zinc meta titanate the following reaction takes place:

$$2ZnTiO_3 \rightarrow Zn_2TiO_4 + TiO_2(\text{rutile}) \quad (1)$$

The titanium dioxide which by this calcination process is set free crystallizes in the form of rutile in contradistinction to the raw material as it is used for the manufacture of titanium pigments i. e. anatase. A mixture is thus obtained containing zinc ortho titanate and rutile which mixture shows a good fastness to chalking and which is distinguished, due to the high refraction of light of the rutile, by an excellent covering power. The presence of the rutile can for instance be detected by X-ray analysis. It has been found that small quantities of titanate, i. e. of zinc, react upon even large quantities of titanium dioxide to convert it into the form of rutile. For instance this conversion is complete with a batch, containing only 1 mol of zinc oxide upon 3 mols of titanium dioxide. The conversion is possibly caused by the fact that, besides the reaction which is described in Equation 1, when heating, the following reaction takes place:

$$Zn_2TiO_4 + TiO_2(\text{anatase}) \rightarrow 2ZnTiO_3 \quad (2)$$

The zinc meta titanate thus formed then reacts according to (1) and is split up into ortho titanate and rutile. The ortho titanate may again undergo the conversions described.

A part of the zinc can isomorphously be replaced by magnesium, for instance up to about 70%, furthermore besides rutile and zinc or magnesium titanate respectively also stretching or filling materials can be present as the sulphates or the carbonates of the alkaline earth metals, which are either mixed thereto or which are prepared by precipitation upon the end-product or also upon the starting materials.

The following examples illustrate the invention, the parts being by weight.

Example 1

12 parts of zinc oxide and 10 parts of titanium dioxide are calcined for 10 hours at 850°. A white pigment is obtained of good fastness to chalking and an excellent covering power, consisting of zinc ortho titanate and about 10 per cent of rutile.

Example 2

Zinc meta titanate is calcined for about 6 hours at 900°, whereby a white pigment containing about 50 mols per cent of rutile besides zinc ortho titanate is obtained.

Example 3

12 parts of zinc oxide, 3 parts of magnesium oxide and 10 parts of titanium dioxide are calcined for 10 hours at 1050°. A mixture is thus obtained containing about 25 mols per cent of rutile and 75 mols per cent of mixed crystals of zinc and magnesium ortho titanate. Instead of the oxides there may also be used the corresponding quantities of salts as for instance sulphates or oxide hydrates.

Example 4

1 part of zinc oxide is heated with 3 parts of titanium-dioxide for 12 hours to 900°. A mixture of zinc ortho titanate is obtained with about 60 mols per cent of rutile.

Example 5

A mixture of titanium dioxide hydrate and barium sulphate (with 25 per cent $TiO_2$ calculated on the dry substance) is heated with 7% of zinc oxide (always calculated on the dry mixture) for about 10 hours to 900°. A pure white pigment is obtained of a good fastness to weathering consisting of zinc ortho titanate, rutile and barium sulphate.

Example 6

10 parts of titanium dioxide obtained from titanium-tetrachloride are heated with 6 parts of zinc carbonate during 6 hours to 950° and then chilled in water. To the aqueous suspension of the mixture consisting of zinc titanate with rutile a solution from 2 parts of barium chloride and that quantity of sodium carbonate which is necessary for precipitating the barium as carbonate is added. Thus a mixture of zinc titanate-rutile is obtained upon which barium carbonate is precipitated.

Example 7

5 parts of a zinc titanate with a molecular proportion of zinc oxide to titanium-dioxide= 1.1:1 are calcined with one part of magnesium sulphate during 5 hours at 950°. A pigment is obtained which, due to its content of rutile and zinc ortho titanate, proves an extraordinarily good fastness to weathering and which is distinguished, due to its content of magnesium, by an excellent whiteness.

In our co-pending application of Serial No. 11,164 filed together with Max Günther March 14, 1935, we have disclosed a process for the preparation of white pigments which, aside from the possible content of magnesium, consists essentially of zinc meta titanate and/or zinc ortho titanate. Pigments resulting from the methods of the said co-pending application are substantially free from uncombined titanium dioxide.

In the appended claims the terms "zinc oxide" and "anatase titanium dioxide" include as their obvious equivalents such compounds of zinc and titanium, respectively, as will upon heating to the temperatures employed in applicants' process become converted to the zinc oxide or anatase titanium dioxide, as the case may be.

We claim:

1. A process for preparing white pigments comprising heating anatase titanium dioxide admixed with a minor amount of a mixture of zinc oxide and magnesium oxide between above 840° and 1100° C. until by X-ray examination the presence of a substantial amount of rutile titanium dioxide can be detected.

2. A process for preparing white pigments comprising heating titanium dioxide selected from the group consisting of hydrous titanium oxide and calcined anatase titanium dioxide admixed with a minor amount of a composition selected from the group consisting of mixtures of zinc oxide and magnesium oxides, mixtures of compounds which on heating yield the oxides of zinc and magnesium and zinc-magnesium titanate between above 840° C. and 1100° C. until by X-ray examination the presence of a substantial amount of rutile titanium dioxide can be detected.

3. A process for preparing white pigments comprising heating a mixture of anatase titanium dioxide, zinc oxide, and magnesium oxide in which the magnesium oxide may constitute up to about 70 percent of the combined weight of the zinc oxide and magnesium oxide and the mol ratio of the zinc and magnesium (calculated as ZnO and MgO) to the titanium (calculated as $TiO_2$) being less than 2:1 between above 840° C. and 1100° C. until by X-ray examination the presence of a substantial amount of rutile titanium dioxide can be detected.

4. A process for preparing white pigments comprising heating a mixture of anatase titanium dioxide and zinc-magnesium titanate in which titanate up to about 70 percent of zinc has been isomorphously replaced by the magnesium and the mol ratio of the zinc and magnesium (calculated as ZnO and MgO) to the titanium (calculated as $TiO_2$) in the said mixture being less than 2:1 between above 840° C. and 1100° C. until by X-ray examination the presence of a substantial amount of rutile titanium dioxide can be detected.

5. As a new rutile pigmentary composition, a product substantially identical with that obtainable by the process defined in claim 4.

EKBERT LEDERLE.
RUDOLF BRILL.

CERTIFICATE OF CORRECTION.

Patent No. 2,275,856. March 10, 1942.

EKBERT LEDERLE, ET AL.

It is hereby certified that error appears in the printed specification of the above numbered patent requiring correction as follows: Page 2, second column, line 43, claim 5, for the claim reference numeral "4" read --1--; and that the said Letters Patent should be read with this correction therein that the same may conform to the record of the case in the Patent Office.

Signed and sealed this 4th day of August, A. D. 1942.

(Seal)

Henry Van Arsdale,
Acting Commissioner of Patents.